United States Patent
Kanwar et al.

[11] Patent Number: 5,902,515
[45] Date of Patent: May 11, 1999

[54] SOLUTIONS AND METHODS FOR INHIBITING CORROSION

[75] Inventors: Sumeet Kanwar; Paul Eaton, both of Houston, Tex.

[73] Assignee: Champion Technologies, Inc., Houston, Tex.

[21] Appl. No.: 08/516,000

[22] Filed: Aug. 16, 1995

[51] Int. Cl.$^6$ .............................. C09K 3/00; C23F 11/10; F16L 58/00

[52] U.S. Cl. .......................... 252/390; 252/387; 252/388; 252/392; 252/394; 252/396; 106/14.15; 106/14.31; 106/14.41; 106/14.42; 507/933; 507/939

[58] Field of Search ..................................... 507/933, 939; 252/392, 394, 396, 387, 390, 388; 106/14.26, 14.31, 14.41, 14.42, 14.05, 14.15

[56] References Cited

U.S. PATENT DOCUMENTS

| | | | |
|---|---|---|---|
| 3,619,427 | 11/1971 | Kautsky | 210/58 |
| 3,779,935 | 12/1973 | McDougall et al. | 252/149 |
| 3,932,296 | 1/1976 | Byth | 252/148 |
| 4,420,414 | 12/1983 | Valone | 252/392 |
| 4,435,361 | 3/1984 | DaGue et al. | 422/12 |
| 4,554,090 | 11/1985 | Jones | 252/181 |
| 4,557,838 | 12/1985 | Nichols et al. | 252/8.55 |
| 4,614,600 | 9/1986 | Schilling et al. | 252/8.553 |
| 5,027,901 | 7/1991 | French et al. | 166/310 |
| 5,174,913 | 12/1992 | Alford et al. | 252/8.555 |
| 5,292,480 | 3/1994 | Fischer et al. | 422/12 |
| 5,322,640 | 6/1994 | Byrne et al. | 252/389 |
| 5,336,441 | 8/1994 | Shah et al. | 252/390 |
| 5,543,388 | 8/1996 | Williams et al. | 507/269 |

FOREIGN PATENT DOCUMENTS 289109  12/1970  Russian Federation.

OTHER PUBLICATIONS

Isagulants, V.I. et al., Synthesis of Additives Based on Bicyclic Imidazolines, Tr. Vses. Nauch.—Tekh. Soveshch. Prisadkam Miner. Maslam 2d., 1966 (1968) pp. 115–117.

*Primary Examiner*—Shean C. Wu
*Attorney, Agent, or Firm*—Vinson & Elkins L.L.P.

[57] ABSTRACT

A corrosion inhibitor comprising a dispersant, an imidazoline, an amide, an alkyl pyridine and a heavy aromatic solvent. The resultant blend effectively inhibits corrosion of flow lines containing low pH mixtures of hydrocarbons, water, and acid gases.

19 Claims, 4 Drawing Sheets

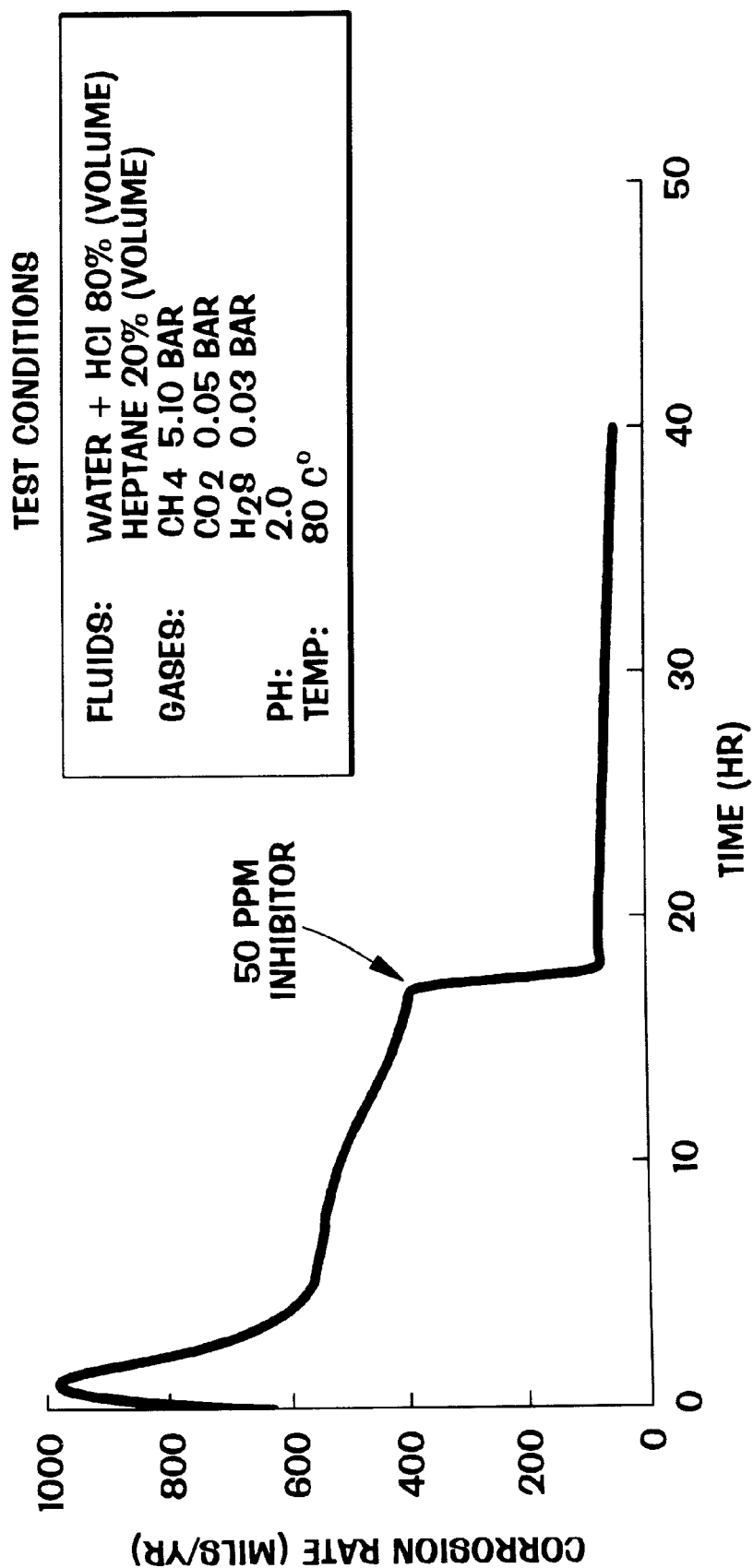

SOLUTIONS AND METHODS FOR INHIBITING CORROSION

BACKGROUND OF THE INVENTION

1. Field of the Invention

This invention relates to solutions and processes for inhibiting corrosion. More specifically, this invention relates to solutions and processes for inhibiting corrosion of flow line surfaces that contain a mixture of hydrocarbons, water, and acid gases.

2. Description

Petroleum refiners have long sought a solution to corrosion of flow line surfaces that contain highly acidic mixtures of hydrocarbons, water, and acid gases such as carbon dioxide ($CO_2$), hydrogen chloride (HCl), and hydrogen sulfide ($H_2S$). Refiners have had particular difficulty preventing corrosion caused by highly acidic mixtures, specifically those mixtures having a pH lower than 4–5, in refinery distillation tower overhead streams. As the steam in the overhead gas from a tower is condensed into liquid water at the surface of condensation equipment, some of the acid gases also condense and become dissolved in the liquid water or water phase. The resulting aqueous solution is highly acidic and thus corrodes the tower overhead piping, vessels, pumps, exchangers, and other equipment that will be familiar to one skilled in the art.

The conventional solution to the problem of inhibiting corrosion has been to add a neutralizing agent to the mixture of hydrocarbons, water, and acid gases to raise the pH. Such neutralizing agents have included ammonia and neutralizing amines, such as diethanolamine, methoxypropylamine, and morpholine. Some equipment operators have found that adding filming amines to the neutralizing amines further reduces corrosion of flow line surfaces.

Unfortunately, conventional filming amine corrosion inhibitors are ineffective in the low pH environment of petroleum refinery tower overhead streams. The conventional practice of adding neutralizing amines to elevate pH such that conventional filming amine corrosion inhibitors may be used has proved unsatisfactory. Above a pH of five (5), many naturally soluble species such as iron sulfide (FeS) and iron carbonate ($FeCO_3$) form insoluble deposits that reduce the size of flow paths and eventually plug the equipment by totally blocking the flow path. Also, neutralizing amines may react to form corrosive salts and deposits that plug the flow lines of tower overhead piping and equipment. Therefore, the application of neutralizing amines in conjunction with conventional filming amines that do not inhibit corrosion in low pH environments has not satisfactorily solved the problem of inhibiting corrosion. The addition of neutralizing amines must be done judiciously, using as little neutralizing amine as possible to avoid possibly plugging equipment with deposits. In addition, reducing the amount of neutralizing amines used significantly reduces the overall cost of using the equipment to make a product, as neutralizing amines are relatively expensive.

Refiners have also had problems with conventional corrosion inhibitors that form oil/water emulsions. Water is typically separated from hydrocarbon streams, such as gasoline, to avoid contamination of the hydrocarbon product. Conventional corrosion inhibitors that form oil/water emulsions cause undesirable water entrainment in hydrocarbon streams. Thus, there is a need for a corrosion inhibitor that has little tendency to form oil/water emulsions.

Yet another problem with conventional corrosion inhibitors is inadequate distribution of the corrosion inhibitor throughout the corrosive stream. Conventional water-soluble corrosion inhibitors fail to adequately distribute themselves in a flow line that contains predominantly hydrocarbons in a hydrocarbon/water mixture. Poor distribution of conventional corrosion inhibitors causes inadequate corrosion protection of the piping and equipment surfaces because the chemical simply does not get to where it is needed. Thus, a need has long existed for a corrosion inhibitor that distributes itself evenly throughout a predominantly hydrocarbon stream and yet effectively prevents corrosion in the acidic aqueous phase. Solubility of the corrosion inhibitor in the hydrocarbon stream to which the inhibitor is added is a desirable characteristic. Because hydrocarbon solubility of a corrosion inhibitor enhances adequate distribution within the equipment to be protected, there is a need for a corrosion inhibitor that is hydrocarbon soluble yet still protects against corrosion in an aqueous phase.

Thus, there is a need for a corrosion inhibitor that (1) inhibits corrosion at low pH ranges, (2) is soluble in hydrocarbons such that the corrosion inhibitor is adequately distributed through the corrosive stream, (3) provides protection against corrosion in the aqueous phase of the fluid contained in the piping and equipment to be protected, and (4) does not cause an oil/water emulsion problem in the fluid contained in the flow lines to be protected, and more particularly, in the piping, condensers, pumps, vessels and other equipment in a distillation tower overhead system.

SUMMARY OF THE INVENTION

The present invention satisfies the need for a corrosion inhibitor that (1) inhibits corrosion at low pH ranges, (2) is soluble in hydrocarbon such that the inhibitor adequately distributes through the corrosion stream, (3) provides protection against corrosion in the aqueous phase of the fluid contained in the flow lines to be protected, and (4) does not cause an oil/water emulsion problem in the fluid contained in the flow lines to be protected, and more particularly, in the piping, condensers, pumps, vessels, and other equipment in a distillation tower overhead system.

The present invention is a corrosion inhibitor composition which includes the following chemicals in a mixture: a pentane-soluble imidazoline, a pentane-soluble amide, a pyridine-based compound, a pentane-soluble dispersant, and a solvent.

BRIEF DESCRIPTION OF THE DRAWINGS

These and other features, aspects and advantages of the present invention will become better understood with regard to the following description, appended claims and accompanying drawings where:

FIG. 4 is a graph showing the corrosion inhibiting result of the present invention.

Additional objects, advantages and novel features of the invention will be set forth in part in the description which follows, and will become apparent to those skilled in the art upon examination of the following or may be learned by practice of the invention.

DETAILED DESCRIPTION

Figure 1:
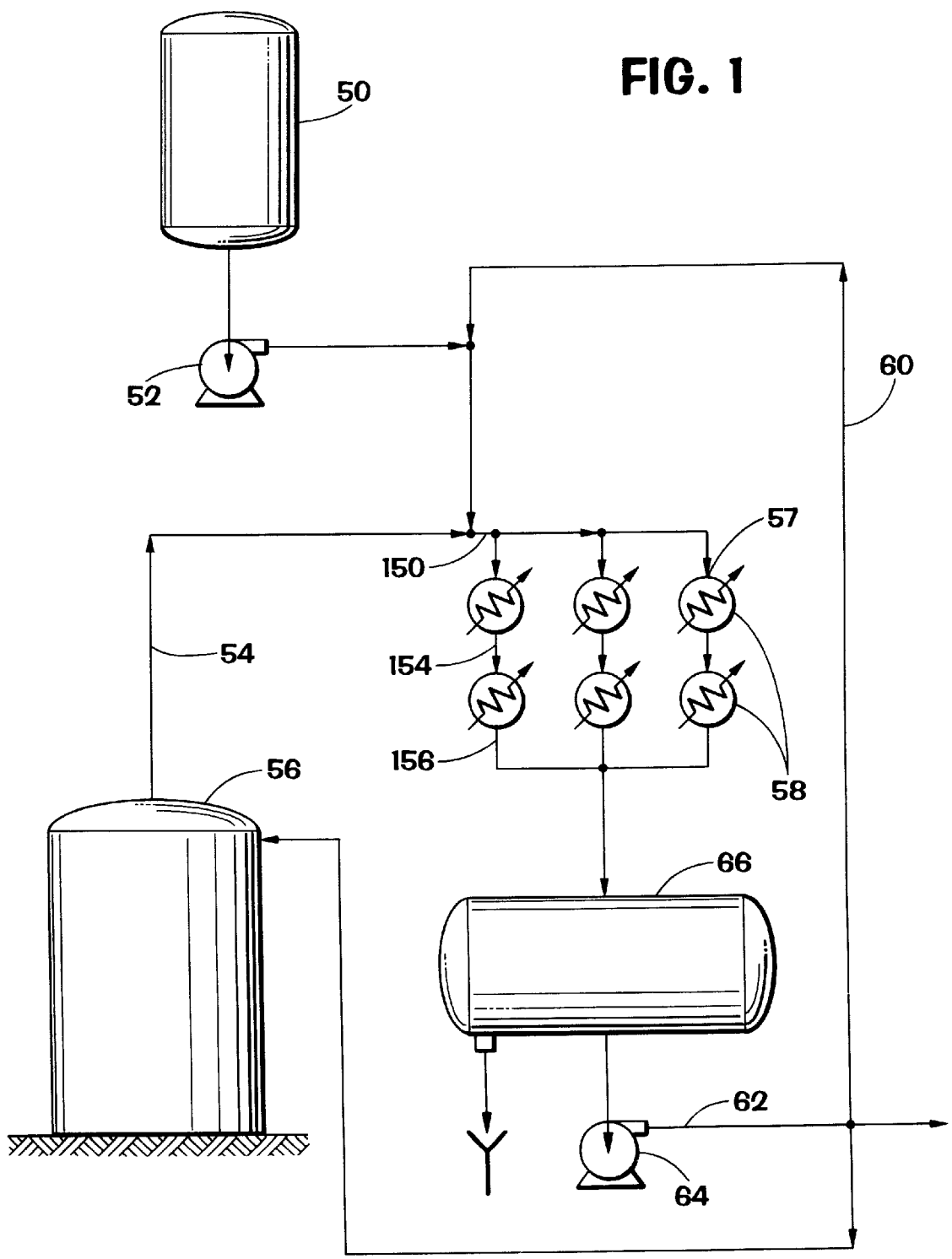
FIG. 1 is a schematic of an injection system in which the present invention is used.

The solutions and methods of inhibiting corrosion of the present invention may be implemented by the use of a typical corrosion inhibitor injection system shown in FIG. 1. Such injection systems are commonly used with conventional corrosion inhibitors, such as neutralizing amines and filming amines. Operators using conventional corrosion inhibitors with this typical system may be able to use the solutions and methods of the current invention with few hardware changes to their plant.

In the typical corrosion inhibitor injection system shown schematically in FIG. 1, the corrosion inhibitor is injected up flow from the surfaces of the flow lines to be protected. As used hereinafter, the term "flow line" shall include piping 150, 154, 156, condensers 58, reflux drums 66, reflux pumps 64, and other piping, vessels, pumps, condensers, and equipment that contain a corrosive agent, such as an acid gas dissolved in an aqueous mixture.

The corrosion inhibitor is typically stored in a pot 50 from which a metering pump 52 is used to inject the corrosion inhibitor into the flow lines (as defined above) to be protected. To best protect distillation tower overhead piping and equipment, the corrosion irhibitor is added into the tower overhead vapor line 54 between the top of the tower 56 and the inlet 57 to the overhead gas condensers 58. The corrosion inhibitor is typically diluted with a slipstream 60 of hydrocarbon from the reflux drum 66.

The present invention is directed to solutions for inhibiting corrosion comprising solutions, blends or mixtures of: a pentane-soluble imidazoline, a pentane-soluble amide, a pyridine-based compound selected from the group consisting of pyridine, monoalkyl pyridines, dialkyl pyridines, and trialkyl pyridines where the alkyl groups have one to three carbon atoms; a pentane-soluble dispersant, particularly a dispersant formula marketed under the trademark DMAD by Buckman Laboratories International, Inc., 1256 N. McLean Blvd., Memphis, Tenn. has been used; however, equivalent dispersants generally designated as pentane-soluble, amide-based dispersants may be used; and a solvent, particularly a solvent that is designated as Advasol 150 marketed by Advanced Aromatics, Inc. of 5501 Baker Road, Baytown, Tex.; 77521 has been used; however, equivalent solvents generally designated as heavy aromatic solvents having a boiling point of 400–580 degrees Fahrenheit may be used. As used herein, the term "boiling point" refers to the boiling point at 760 millimeters of mercury absolute pressure. It will be understood by one skilled in the art that mixtures of the aforementioned pyridine-based compounds may be used. Also, the pentane-soluble amide may be an amide, diamide, triamide, or polyamide. The pentane-soluble imidazoline may include polyimidazolines. It will be understood by one skilled in the art that the aforementioned monoalkyl pyridines, dialkyl pyridines, and trialkyl pyridines include the compounds (and all isomers thereof) represented by the following diagrams:

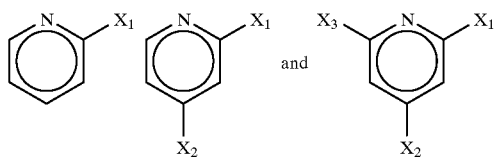

where $X_1$, $X_2$, and $X_3$ can be alkyl groups having one to three carbons. In addition, the present invention is also directed to processes of inhibiting corrosion by the use of such blends.

While conventional filming amine corrosion inhibitors are ineffective in low pH environments and must be used in conjunction with neutralizing amines, the present invention makes a major departure in the opposite direction. Specifically, the present invention, although based on a filming amine, reduces or eliminates the amount of neutralizing amine required to achieve adequate corrosion protection. In an alternate embodiment, the present invention is enhanced by the addition of a small, corrosion-inhibiting amount of a neutralizing amine.

It has been found that corrosion of flow lines containing hydrocarbons, water, and acid gases is inhibited by the present invention even when the pH of the corrosive mixture is below 4–5. Although other conventional filming amine corrosion inhibitors are generally ineffective below a pH of 5, the corrosion inhibitor of the present invention is effective even at a pH below 4. Because the corrosion inhibitor of the present invention is effective at lower pH ranges, the amount of expensive neutralizing amine that must be added to the fluid contained in the flow lines protected is substantially reduced. The present invention eliminates or reduces the need for neutralizing amines, thus decreasing the risk of depositing solids in the piping and equipment in the distillation tower overhead system.

Another advantage of the corrosion inhibitor of the current invention is that the corrosion inhibitor is soluble in light hydrocarbons that have at least 5 carbons atoms (such as pentane). Notwithstanding the oil solubility of the corrosion inhibitor of the present invention, the corrosion inhibitor sufficiently disperses into the aqueous phase of the fluid in the flow lines to be protected. It is important that a corrosion inhibitor sufficiently disperse into the aqueous phase in order to provide adequate corrosion protection.

Yet another advantage of the corrosion inhibitor of the present invention is its low tendency to form oil/water emulsions. The corrosion inhibitor of the present invention has a WSIM number greater than 80. The WSIM number is a standardized ASTM test parameter and is an indication of the tendency of a substance to entrain water in its hydrocarbon phase. The WSIM (water separation index modification) number increases as emulsion-forming tendencies decrease.

Specifically, the corrosion inhibitor of the present invention is comprised of the following aforementioned components in the following respective compositions:

| Component | Weight Percentage Ranges |
| --- | --- |
| Pentane-soluble Imidazoline | 0.5–30 |
| Pentane-soluble Amide | 0.5–30 |
| Pentane-soluble Dispersant | 0.5–10 |
| Pyridine-based compound | 1.0–50 |
| Heavy Aromatic Solvent | 30–90 |

The preferred composition is as follows:

| Component | Weight Percentage |
| --- | --- |
| Pentane-soluble Imidazoline | 5 |
| Pentane-soluble Amide | 15 |
| Pentane-soluble Dispersant | 5 |
| Pyridine-based compound | 10 |
| Heavy Aromatic Solvent | 65 |

Because the components are mixed together as liquids, heating the liquids to lower their viscosity accelerates the mixing process. The components of the corrosion inhibitor of the present invention are mixed together until a homogenous mixture is obtained. No particular order of mixing the components is required. A glass vessel is the preferred mixing container. The corrosion inhibitor of the present method is known to be effective at temperatures up to 300 degrees Fahrenheit.

To use the described corrosion inhibitor mixture, the corrosion inhibitor of the present invention is continuously added to the fluid contained in the flow lines to be protected in an amount sufficient to prevent corrosion. It has been found that a corrosion inhibiting dose of 5–25 parts per million by volume (ppmv) of the corrosion inhibitor is generally sufficient to provide an effective level of corrosion protection. In the preferred mode, the corrosion inhibitor is continuously added to the fluid contained in the flow line to be protected to maintain a corrosion inhibiting amount of 6–9 ppmv of the corrosion inhibitor. When the present invention is used in its preferred mode with a distillation tower overhead system such as that shown in FIG. 1, the corrosion inhibitor of the present invention is diluted with a slipstream 60 of hydrocarbon in a ratio of 10 parts by volume hydrocarbon to 1 part by volume corrosion inhibitor. When used in a tower overhead system, the preferred hydrocarbon slipstream 60 is tower reflux 62 from the discharge of the reflux pump 64.

Although continuous addition of the corrosion inhibitor is generally preferred, batchwise addition of a corrosion-inhibiting amount of the corrosion inhibitor of the present invention may also be used.

The corrosion inhibitor of the present invention has been used in applications with a variety of fluid velocities through the flow line to be protected. The present invention has been found to be effective at fluid velocities up to 25 feet per second.

EXAMPLES

Example 1

Preparation of Corrosion Inhibitor of Present Invention

In the preferred embodiment, the components of Table 1 were first heated individually until fluid and then blended until homogenous in a glass container. Preparation of corrosion inhibitors using other relative amounts of imidazoline, amide, pyridine-based compounds, pentane-soluble dispersant, and heavy aromatic solvent is similar to the procedure described above.

TABLE 1

|  | Weight Percentage |
|---|---|
| Pentane-soluble Imidazoline | 5 |
| Pentane-soluble Amide | 15 |
| Pyridine-based compound | 10 |
| Pentane-soluble Dispersant | 5 |
| Heavy Aromatic Solvent | 65 |

In the preferred embodiment listed in Table 1, the imidazoline was a bis-imidazoline with the formula:

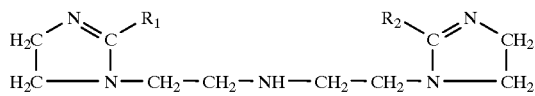

where $R_1$ and $R_2$ were selected from the group consisting of all hydrocarbons having twelve to eighteen carbon atoms; the amide had the formula:

where $R_3$ was selected from the group consisting of all hydrocarbons having twelve to eighteen carbon atoms; the pyridine-based compound was selected from the group consisting of pyridine, monoalkyl pyridines, dialkyl pyridines, and trialkyl pyridines where the alkyl groups have one to three carbon atoms; the pentane-soluble dispersant was a dispersant marketed under the trademark DMAD by Buckman Laboratories International, Inc., 1256 N. McLean Blvd., Memphis, Tenn.; and the solvent was a heavy aromatic solvent designated as Advasol 150 marketed by Advanced Aromatics, Inc. of 5501 Baker Road, Baytown, Tex. 77521.

Example 2

Corrosion Test

Figure 2:
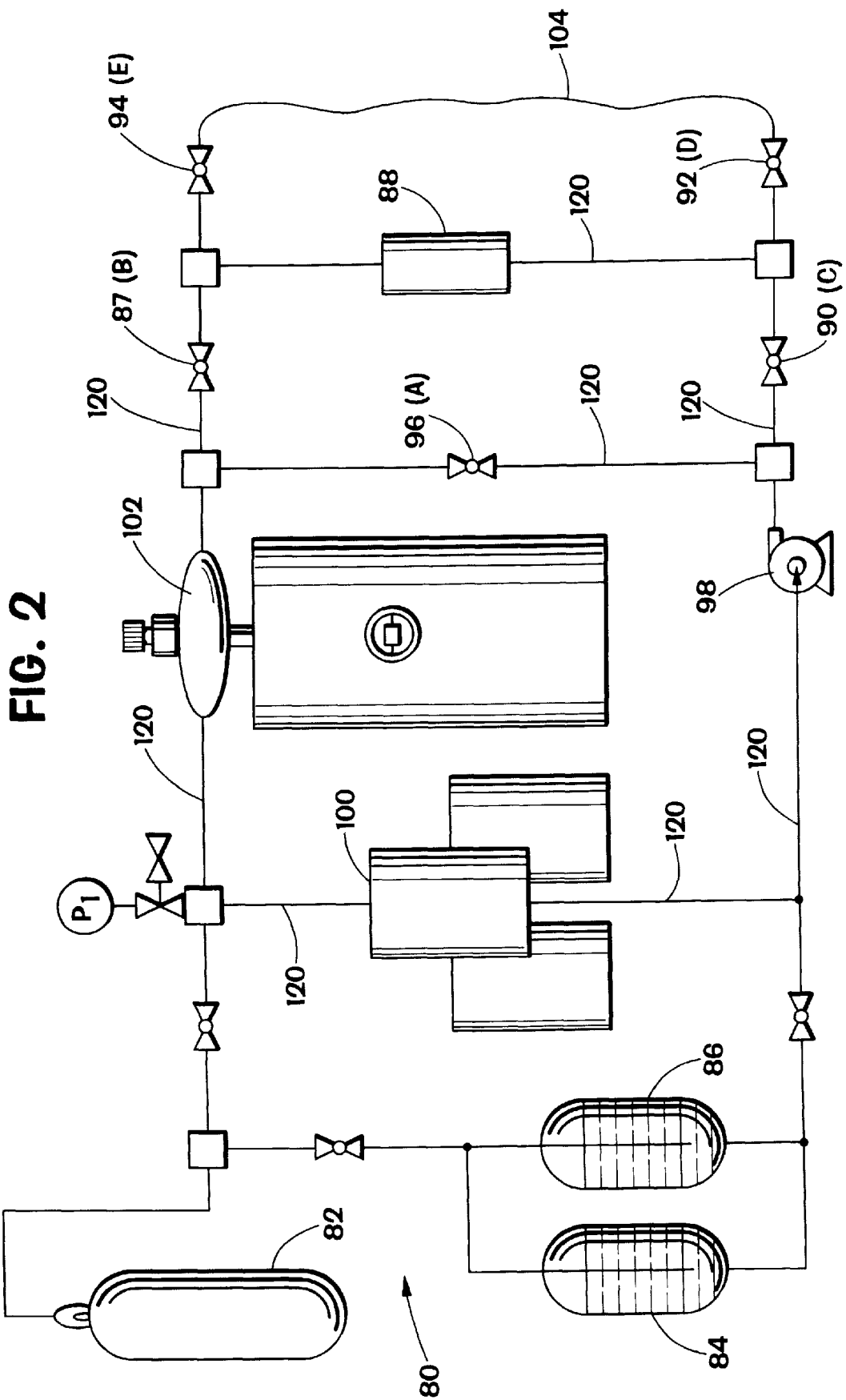
FIG. 2 is a schematic of the system used to test the solutions and methods of the present invention for the inhibition of corrosion.
Figure 3:
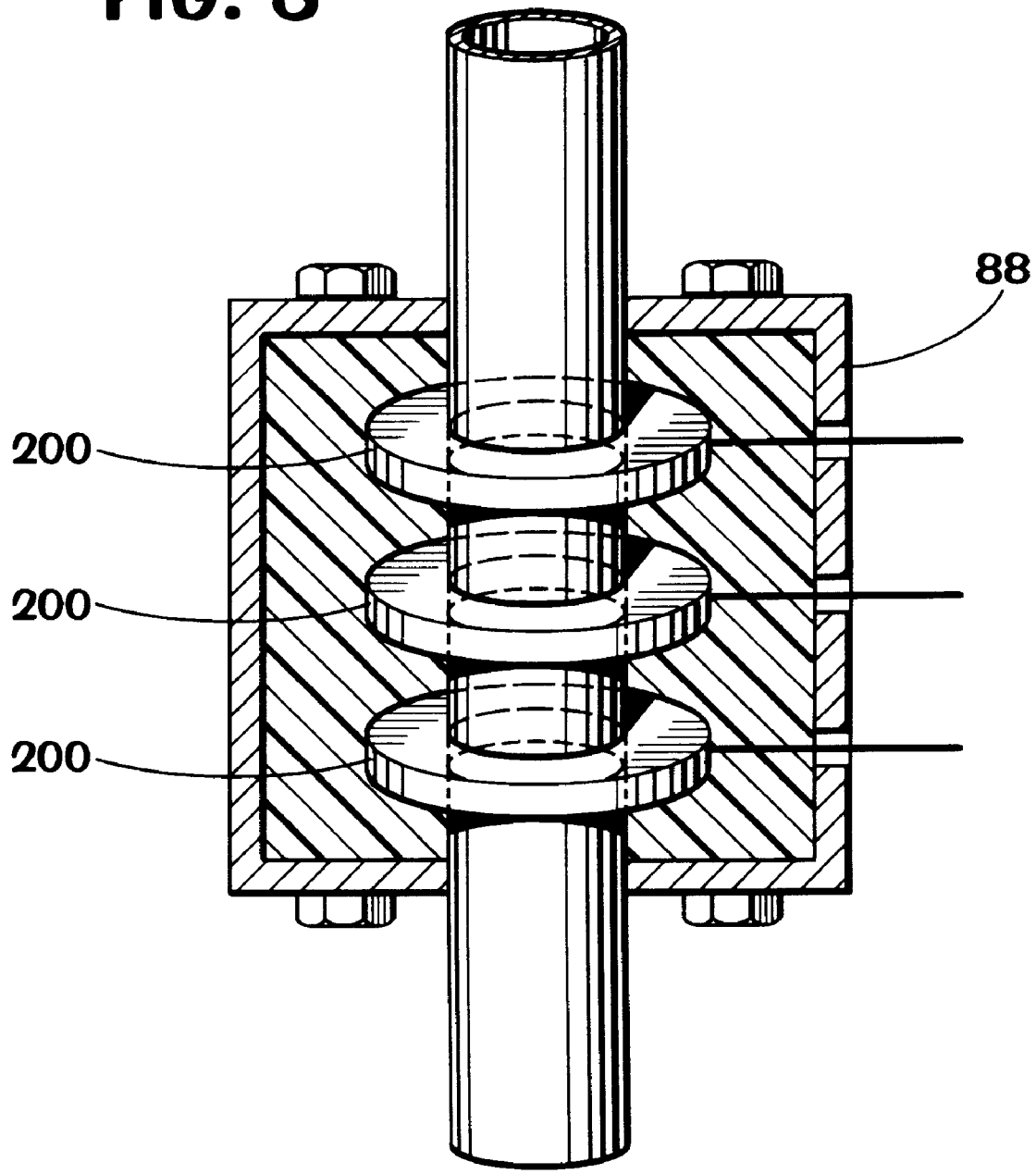
FIG. 3 is a cutaway view of the electrochemical corrosion cell used in the system shown in FIG. 2.

The corrosion inhibiting characteristics of the present invention were evaluated in the flow loop system 80 shown in FIG. 2. Corrosion rates of steel test coupons 200 (FIG. 3) contained in corrosion test cell 88 were measured before and after injection of the corrosion inhibitor of the present invention. As indicated by the results shown in the graph of FIG. 4, the corrosion inhibitor of the present invention inhibited corrosion of the test coupons 200 even in a low pH environment.

As illustrated in FIG. 2, an acid gas comprising approximately 98.5 mole % methane, 1.0 mole % carbon dioxide and 0.5 mole % hydrogen sulfide was stored in a cylinder 82. An aqueous mixture with a pH of 2 was prepared by mixing liquid water with a sufficient amount of hydrochloric acid in the water container 84. The acid gas was sparged through the aqueous mixture in the water container 84 for at least three hours. The acid gas was also sparged through a test oil of heptane in an oil container 86 for at least three hours.

Valve B 87, valve C 90, valve D 92, and valve E 94 were closed and valve A 96 was opened. Acid gas from the cylinder 82 was also used to pressure the aqueous mixture from the water container 84 and the test oil from the oil container 86 into the flow loop 120. The resulting oil/water mixture in the flow loop was 80 percent by volume aqueous mixture and 20 percent by volume test oil, both such components being at least partially saturated with acid gas.

The pump 98 was turned on to circulate the oil/water mixture contained in the flow loop 120. The oil/water mixture was discharged from the pump 98 and caused to flow through valve A 96. From valve A 96, the oil/water mixture passed through the mass flow meter 102 and into the autoclave 100. The autoclave 100 heated the oil/water mixture to 80° C.

When the flow loop mixture reached the desired temperature, valve A 96 was closed and valve B 87 and valve C 90 were opened to establish flow from the discharge of the pump 98 through valve C 90. After exiting valve C 90, the oil/water mixture entered the electrochemical cell 88. The electrochemical cell 88, also shown in FIG. 3, used a standard electrochemical technique, specifically, linear polarization resistance, to measure the corrosion rate of test coupons 200.

After passing through the electrochemical corrosion cell 88, the oil/water mixture passed serially through valve B 87 and the mass flow meter 102 to the autoclave 100. After exiting the autoclave 100, the oil/water mixture flowed back to the suction of the pump 98. With the oil/water mixture circulating through the flow loop 120 in this manner, a baseline corrosion rate of the coupons 200 in the corrosion cell 88 was thus established for between 15 and 20 hours.

After establishment of the baseline corrosion rate, the corrosion inhibitor under evaluation was added to the oil/water mixture. A 50 parts per million by volume dosage of corrosion inhibitor was added to the oil/water mixture by pouring the inhibitor into a flexible hose 104, connecting the hose across valve D 92 and valve E 94, and opening valves D 92 and E 94. With the pump 98 circulating the oil/water mixture through the flexible hose 104, the corrosion inhibitor was blended with the oil/water mixture. The corrosion rates were monitored after the addition of the corrosion inhibitor.

As demonstrated by the results shown on FIG. 4, the corrosion inhibitor composition of Example 1 dramatically reduced the corrosion rate. Specifically, introduction of the corrosion inhibitor at about 18 hours reduced the corrosion rate from approximately 400 mils per year to approximately 20 mils per year where it remained for an additional time period of approximately 20 hours.

Example 3

Emulsion Data

American Society for Testing and Materials method D 3948-87, which will be familiar to those skilled in the art, was used to evaluate the emulsion tendency of the corrosion inhibitor of the present invention. The blends described in Table 2 were prepared in a fashion similar to that described in Example 1.

The results of testing of the present invention are shown on Table 2. The MSEP (micro separometer rating) number reported was converted to a WSIM number. WSIM is a commonly-used test parameter for determining the tendency of a substance to form an emulsion with water.

TABLE 2

Emulsification Data

| Blend Component | Run #1 | Run #2 |
|---|---|---|
| Heavy Aromatic Solvent, Vol. % | 53 | 65 |
| Pentane-soluble Amide, Vol. % | 27 | 15 |
| Pentane-soluble Imidazoline, Vol. % | 5 | 5 |
| Pyridine-based compound, Vol. % | 10 | 10 |
| Pentane-soluble Dispersant, Vol. % | 5 | 5 |
| Dosage of Corrosion Inhibitor of Present Invention, parts per million by volume. | 10 | 10 |
| MSEP | 80 | 80 |
| WSIM Number | >80 | >80 |

The corrosion inhibitor of the present invention is effective for inhibiting corrosion of petroleum refinery distillation tower overhead piping and equipment. Specifically, the corrosion of the present invention is most effective for preventing corrosion of flow lines that contain a mixture of hydrocarbon streams containing acid gases such as carbon dioxide, hydrogen sulfide, and hydrogen chloride in the presence of water. In the preferred mode, the corrosion inhibitor of the present invention is used in corrosion inhibiting dosages to prevent corrosion of flow lines made of mild steel, admiralty brass, or stainless steel. It will be understood by one familiar in the art that the present invention may be used to protect surfaces of other metallurgies.

The objects and advantages of the invention may be realized and attained by means of the instrumentalities and combinations particularly pointed out in the accompanying drawings and appended claims.

I claim:

1. A corrosion inhibitor composition comprising:
 a. a pentane-soluble imidazoline;
 b. a pentane-soluble amide selected from the group consisting of pentane soluble amides, diamides, triamides, and polyamides;
 c. a pyridine-based compound selected from the group consisting of pyridine, monoalkyl pyridines, dialkyl pyridines, and trialkyl pyridines where the alkyl groups have one to three carbon atoms;
 d. an amide-based, pentane-soluble dispersant; and
 e. a heavy aromatic solvent having a boiling point of 400–580 degrees Fahrenheit, said imidazoline amide, pyridine-based compound, dispersant, and solvent being present in said composition in selective amounts sufficient to impart to said composition a WSIM value greater than 80.

2. The corrosion inhibitor composition of claim 1, wherein the imidazoline comprises a bis-imidazoline having the formula:

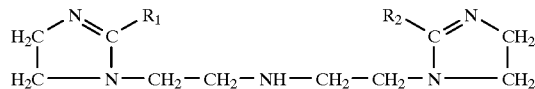

where $R_1$ and $R_2$ are selected from the group consisting of all hydrocarbons having twelve to eighteen carbon atoms.

3. The corrosion inhibitor composition of claim 1, wherein the amide has the formula:

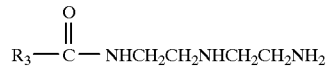

where $R_3$ is selected from the group consisting of all hydrocarbons having twelve to eighteen carbon atoms.

4. The composition of claim 1, wherein the composition contains 0.5 to 30 weight percent of a bis-imidazoline having the formula:

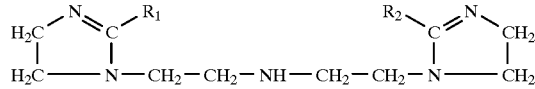

where $R_1$ and $R_2$ are selected from the group consisting of all hydrocarbons having twelve to eighteen carbon atoms.

5. The composition of claim 1, wherein the composition contains 0.5 to 30 weight percent of an amide having the formula:

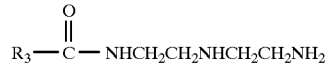

where $R_3$ is selected from the group consisting of all hydrocarbons having twelve to eighteen carbon atoms.

6. The composition of claim 1, wherein the composition contains 0.50 to 10 weight percent of an amide-based, pentane-soluble dispersant.

7. The composition of claim 1, wherein the composition contains one to fifty weight percent of a pyridine-based compound selected from the group consisting of pyridine, monoalkyl pyridines, dialkyl pyridines, and trialkyl pyridines where the alkyl groups have one to three carbon atoms.

8. The composition of claim 1, wherein the composition contains thirty to ninety weight percent heavy aromatic solvent having a boiling point of 400–580 degrees Fahrenheit.

9. A corrosion inhibitor composition comprising:
 a. about five weight percent bis-imidazoline having the formula:

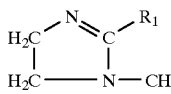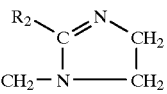 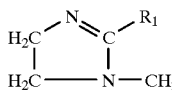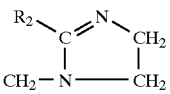

where $R_1$ and $R_2$ are selected from the group consisting of all hydrocarbons having twelve to eighteen carbon atoms;

b. about fifteen weight percent amide having the formula

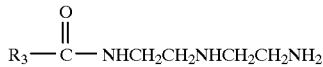

where $R_3$ is selected from the group consisting of all hydrocarbons having twelve to eighteen carbon atoms;

c. about five weight percent amide-based, pentane-soluble dispersant;

d. about ten weight percent pyridine-based compound selected from the group consisting of: pyridine, monoalkyl pyridines, dialkyl pyridines, and trialkyl pyridines where the alkyl groups have one to three carbon atoms; and e. about sixty-five weight percent heavy aromatic solvent having a boiling point of 400–580 degrees Fahrenheit, wherein said corrosion inhibitor composition has a WSIM value greater than 80.

10. The corrosion inhibitor composition of claim 1, further comprising a corrosion inhibiting amount of a neutralizing amine.

11. A process for making a corrosion inhibitor comprising mixing together in proportions sufficient to achieve a WSIM value greater than 80 at least one each of:

a. a pentane-soluble imidazoline;

b. a pentane-soluble amide selected from the group consisting of pentane soluble amides, diamides, triamides, and polyamides;

c. a pyridine-based compound selected from the group consisting of pyridine, monoalkyl pyridines, dialkyl pyridines, and trialkyl pyridines where the alkyl groups have one to three carbon atoms;

d. an amide-based, pentane-soluble dispersant; and e. a heavy aromatic solvent having a boiling point of 400–580 degrees Fahrenheit.

12. The process of claim 11, wherein the imidazoline is a bis-imidazoline having the formula:

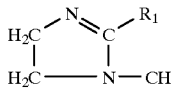 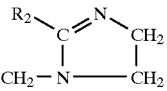

where $R_1$ and $R_2$ are selected from the group consisting of all hydrocarbons having twelve to eighteen carbon atoms.

13. The process of claim 11, wherein the amide has the formula:

where $R_3$ is selected from the group consisting of all hydrocarbons having twelve to eighteen carbon atoms.

14. A product made by the process of claim 11, wherein the product contains: 0.5 to 30 weight percent of a bis-imidazoline having the formula:

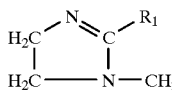 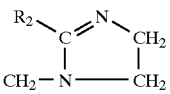

where $R_1$ and $R_2$ are selected from the group consisting of all hydrocarbons having twelve to eighteen carbon atoms.

15. A product made by the process of claim 11, wherein the product contains 0.5 to 30 percent of an amide having the formula:

where $R_3$ is selected from the group consisting of all hydrocarbons having twelve to eighteen carbon atoms.

16. A product made by the process of claim 11, wherein the product contains 0.50 to 10 weight percent of an amide-based, pentane-soluble dispersant.

17. A product made by the process of claim 11, wherein the product contains one to fifty weight percent of a pyridine-based compound selected from the group consisting of: pyridine, monoalkyl pyridines, dialkyl pyridines, and trialkyl pyridines where the alkyl groups have one to three carbon atoms.

18. A product made by the process of claim 11, wherein the product contains thirty to ninety weight percent of a heavy aromatic solvent having a boiling point of 400–580 degrees Fahrenheit.

19. A corrosion inhibitor composition suitable for protection of refinery distillation tower overhead systems operating at pH levels lower than 4 comprising:

a. five weight percent bis-imidazoline having the formula:

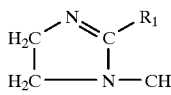 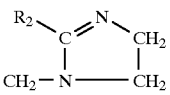

where $R_1$ and $R_2$ are selected from the group consisting of all hydrocarbons having twelve to eighteen carbon atoms;

b. fifteen weight percent amide having the formula

where $R_3$ is selected from the group consisting of all hydrocarbons having twelve to eighteen carbon atoms;

c. five weight percent amide-based, pentane-soluble dispersant;

d. ten weight percent pyridine-based compound selected from the group consisting of: pyridine, monoalkyl pyridines, dialkyl pyridines, and trialkyl pyridines where the alkyl groups have one to three carbon atoms; and e. sixty-five weight percent heavy aromatic solvent having a boiling point of 400–580 degrees Fahrenheit, wherein said corrosion inhibitor composition has a WSIM value greater than 80.

* * * * *